Patented May 2, 1933

1,906,754

UNITED STATES PATENT OFFICE

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE

TRISAZO DYE AND PROCESS OF PREPARING THE SAME

No Drawing.    Application filed February 17, 1928. Serial No. 255,200.

This invention relates to trisazo dyes for cotton and to the method of preparing the same. More particularly, it is concerned with blue dyes of excellent fastness to light and with the method of their preparation which involves diazotizing an aromatic amino compound, containing at least one acid group capable of forming a salt, coupling this diazo compound with alpha-naphthylamine-6-or 7-sulphonic acid, then diazotizing the resulting amino azo compound, coupling the resulting diazo azo compound with 2-amino-5-naphthol-7-sulphonic acid, diazotizing the resulting disazo intermediate and finally coupling with a 1-amino-8-naphthol disulphonic acid.

The new dye compounds prepared in this manner may be represented by the general formula:

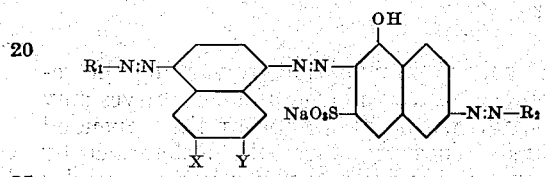

in which $R_1$ represents an aromatic radical containing at least one acid group capable of forming a salt; $R_2$ represents a 1-amino-8-naphthol-disulphonic acid, and in which one of the positions X and Y is occupied by a sulphonic acid group.

The new dye compounds and their preparation are disclosed in the following examples of actual embodiments of the process. It is to be understood that these examples are furnished by way of illustration only, and that the details of the procedure specified therein, as well as the particular proportions, reagents, temperatures, etc., are susceptible of variation and substitution. In the examples the parts are given by weight.

Example 1

137 parts of para-amino-benzoic acid are dissolved in 4000 parts of water and 280 parts of 31% hydrochloric acid. The solution is then diazotized at 10–15° C. with 69 parts of sodium nitrite. The diazo compound is added to a solution of 245 parts of 1-naphthylamine-7-sodium sulphonate containing 280 parts of crystallized sodium acetate. The coupling is carried out at a temperature of about 15° C. and is complete after about one hour's stirring. It is made slightly alkaline by the addition of sodium hydroxide, then made acid again with 500 parts of 31% hydrochloric acid. A solution of 69 parts of sodium nitrite is added at about 20° C. and the mass allowed to stir for one hour. It is then added to a solution of 239 parts of 2-amino-5-naphthol-7-sulphonic acid, containing 560 parts of sodium carbonate. The coupling temperature should be 0–5° C. This intermediate dye, which shows a bright violet color, is salted out with sodium chloride and filtered. The paste is stirred up with 7000 parts of water, acidified with 400 parts of 31% hydrochloric acid and diazotized at 20° C. with a solution of 69 parts of sodium nitrite. After the diazo has stirred for about an hour, it is added to a solution of 341 parts of the monosodium salt of 1-amino-8-naphthol-3:6-disulphonic acid (H-acid) containing 560 parts of sodium carbonate. The coupling is carried out at 0–5° C. The dye is salted out at 60–70° C. and filtered. In its dry form it is a bluish-black powder, soluble in water with a bright greenish-blue coloration and in concentrated sulphuric acid with a bluish-green coloration. It dyes cotton in bright greenish-blue shades which show a good fastness to washing and very good fastness to light. On mixed fibers of cotton-silk it leaves the silk a pure white from a neutral soap bath. Sodium hydrosulphite will give a pure white discharge on the dyeings.

The new dye has most probably the following formula:

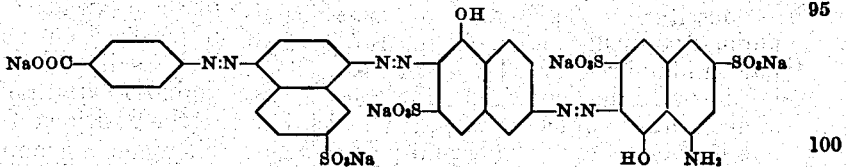

The use of 1-naphthylamine-6-sulphonic acid instead of 1:7 will produce slightly redder shades.

which are practically the same as those of the dye described in Example 2.

This dye has most probably the following formula:

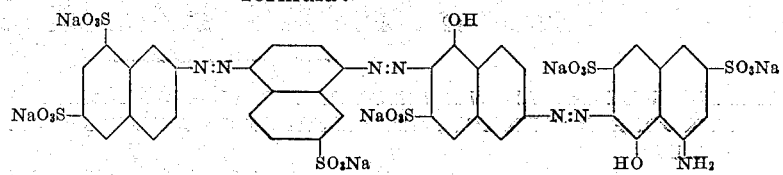

Example 2

Using 153 parts of para-amino-salicylic acid instead of 137 parts of para-amino-benzoic acid, as in Example 1, coupling with the same amount of 1-naphthylamine-7-sulphonic acid, but allowing this coupling to continue overnight with agitation and leaving all other conditions the same as in Example 1, a dye is obtained which is soluble in water with a much greener blue coloration than the para-amino-benzoic acid dye, dyeing cotton likewise in greener blue shades. The properties of this dye are similar to those of Example 1.

This dye has most probably the following formula:

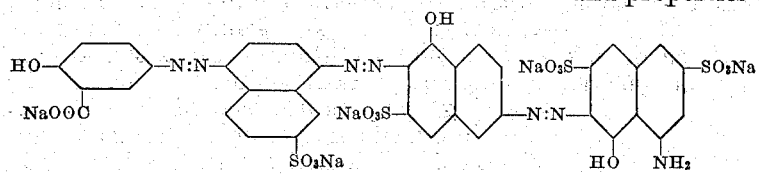

Example 3

Using 187 parts of p-toluidine-m-sulphonic acid, instead of 137 parts of p-amino-benzoic acid, as in Example 1, for coupling with 1-naphthylamine-7-sulphonic acid, dissolving this intermediate in 4000 parts of water containing 53 parts of sodium carbonate, acidifying the solution with 350 parts of 31% hydrochloric acid, then diazotizing with 69 parts of sodium nitrite, leaving all other conditions the same as in Example 1, a dye is obtained which shows practically the same shade and properties as the one described in Example 1. The dye has most probably the following formula:—

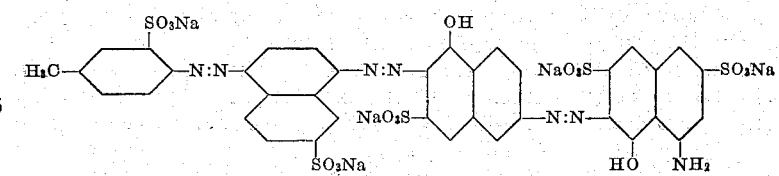

Example 4

Substituting 303 parts of 2-naphthylamine-6:8-disulphonic acid for 137 parts of para-amino-benzoic acid, as in Example 1, leaving all other conditions the same as described in Example 1, a bright greenish-blue dye is obtained, the shade and properties of Other first components may be used, as for example, m-amino-benzoic acid, p-sulphanilic acid, metanilic acid, aniline-disulphonic acid, m-xylidine-o-sulphonic acid, 1:4-, 1:5-, 1:6-, 1:7-naphthylamine-sulphonic acids, 2-naphthylamine-4:8-disulphonic acid, 2-naphthylamine-5:7-disulphonic acid, also amino-naphthol-sulphonic acids, as gamma acid, J-acid, H-acid, etc.

Also, of course, other 1-amino-8-naphthol-disulphonic acids may be employed as end components, instead of the 1:8-3:6 acid employed in the examples. Thus 1:8-3:5, 1:8-4:6 and 1:8-2:4-amino-naphthol-disulphonic acids may be employed as end components with very little effect on the shade and properties of the dye.

It will be obvious that by varying the reagents employed a large number of dyes may be made within the scope of the appended claims. These dyes are all characterized by an unusual affinity for textiles, especially cotton, and an excellent fastness to light.

I claim:

1. A dye compound having the general formula:

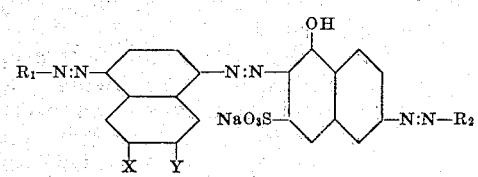

wherein $R_1$ represents an aromatic radical of the benzene or naphthalene series containing at least one acid group capable of forming a salt, $R_2$ represents a radical of a 1-amino-8-naphthol-disulphonic acid and one of the positions X and Y is occupied by a sulphonic acid group.

2. The dyestuff set forth in claim 1 wherein $R_1$ represents an aromatic radical of the benzene or naphthalene series containing at least one acid group capable of forming a salt.

3. The dyestuff set forth in claim 1 wherein $R_1$ represents a radical of an aromatic sulphonic acid belonging to the benzene or naphthalene series.

4. The dyestuff set forth in claim 1 wherein $R_2$ represents the radical of 1-amino-8-naphthol-3:6-disulphonic acid.

5. A dye compound having the formula:

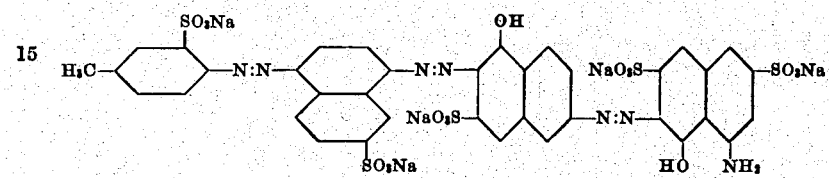

6. The process of preparing a trisazo dye which comprises diazotizing an aromatic amino compound of the benzene or naphthalene series containing at least one acid group capable of forming a salt, coupling the diazo compound with an alpha-naphthylamine having one of the positions 6 and 7 sulphonic acid substituted, diazotizing the resulting aminoazo compound, coupling the resulting diazo azo compound with 2-amino-5-naphthol-7-sulphonic acid, diazotizing the resulting disazo intermediate and coupling with a 1-amino-8-naphthol-disulphonic acid.

7. The process of preparing a trisazo dye which comprises diazotizing p-toluidine-m-sulphonic acid coupling with 1-naphthylamine-7-sulphonic acid, diazotizing the resulting amino-azo-compound, coupling with 2-amino-5-naphthol-7-sulphonic acid, diazotizing and coupling with 1-amino-8-naphthol-3:6-disulphonic acid.

8. The dyestuff set forth in claim 1 wherein $R_1$ represents a nucleus of the group comprising the benzene and naphthalene series which has as a substituent a member of the group consisting of carboxylic and sulphonic acids.

9. The process of preparing a trisazo dye comprising diazotizing an aromatic amino compound of the series comprising benzene and naphthalene having as a substituent at least one group capable of forming a salt, coupling the diazo compound with an alpha-naphthylamine-beta-sulphonic acid in which the substituents are on different rings, diazotizing the resultant aminoazo compound, coupling the resultant with 2-amino-5-naphthol-7-sulphonic acid, diazotizing the resultant disazo compound and coupling with 1-amino-8-naphthol-disulphonic acid.

10. The dyestuff of claim 1 in which the radical $R_1$ contains a carboxyl group.

11. The dyestuff of claim 1 in which the radical $R_1$ contains two acid groups each of which is capable of forming a salt.

12. The dyestuff of claim 1 in which the radical $R_1$ contains two sulphonic groups.

In testimony whereof, I affix my signature.

HENRY JORDAN.